(12) United States Patent
Bergen et al.

(10) Patent No.: US 6,851,908 B2
(45) Date of Patent: Feb. 8, 2005

(54) BALE ACCUMULATOR

(76) Inventors: Harvey G. Bergen, Box 58, Crystal City, Manitoba (CA), R0K 0N0; A. Phil Friesen, c/o Box 58, Crystal City, Manitoba (CA), R0K 0N0

( * ) Notice: Subject to any disclaimer, the term of this patent is extended or adjusted under 35 U.S.C. 154(b) by 0 days.

(21) Appl. No.: 10/464,655

(22) Filed: Jun. 19, 2003

(65) Prior Publication Data
US 2003/0235485 A1 Dec. 25, 2003

(30) Foreign Application Priority Data
Jun. 20, 2002 (CA) .............................................. 2391055

(51) Int. Cl.$^7$ ................................................. B60P 1/00
(52) U.S. Cl. ........................ 414/111; 56/475; 414/517
(58) Field of Search ............................... 56/473.5, 474, 56/475, 476, 480; 414/111, 491, 492, 493, 501, 513, 517, 789.7

(56) References Cited

U.S. PATENT DOCUMENTS

| | | | |
|---|---|---|---|
| 1,763,446 A | 6/1930 | Sancken | |
| 2,649,982 A | 8/1953 | Ray | |
| 3,189,387 A | 6/1965 | Nieto, Jr. | |
| 4,053,064 A | 10/1977 | Stewart | |
| 4,215,964 A | 8/1980 | Schrag et al. | |
| 4,844,675 A | * 7/1989 | Strosser et al. | .............. 414/111 |
| 5,295,776 A | 3/1994 | Meijer | |
| 5,477,668 A | * 12/1995 | Meijer | .......................... 56/474 |
| 5,511,921 A | 4/1996 | Meijer | |
| 5,829,238 A | 11/1998 | Branson | |
| 5,842,823 A | 12/1998 | Kohnen et al. | |
| 6,240,712 B1 | * 6/2001 | Meijer | ..................... 56/16.4 R |

* cited by examiner

Primary Examiner—Janice L. Krizek
(74) Attorney, Agent, or Firm—Ryan W. Dupuis; Adrian D. Battison; Michael R. Williams

(57) ABSTRACT

A bale accumulator is provided for use with a baler for producing rectangular bales of agricultural crops, the accumulator comprising a hitch for connecting the accumulator to the baler, a platform for receiving bales extruded by the baler, a positioning device for arranging the bales in a selected array on the platform, a pusher mounted for movement longitudinally of the platform, an actuator on the accumulator for moving the pusher rearwardly along the platform to move bales along the platform, a rear bale support rearwardly of the platform for supporting bales as they are moved off of the platform by the pusher, and a forward bale support extending forwardly from the pusher for supporting a bale in front of and above the pusher as it is extruded from the baler. The bale accumulator manipulates bales as desired while allowing uninterrupted operation and dumping at any desired location.

13 Claims, 3 Drawing Sheets

BALE ACCUMULATOR

FIELD OF THE INVENTION

The present invention relates to apparatus for handling bales of agricultural crops, and more particularly to bale accumulators.

BACKGROUND OF THE INVENTION

Balers and similar machines have been employed for many years in the agricultural industries for gathering and packaging agricultural crops, for example hay, into bales. The bales are then used for purposes including feeding livestock. As baler technology developed, and particularly with the advent of balers for producing large rectangular bales, bale accumulators were produced to collect the bales generated by a baler, position the bales on the ground in a selected array or pattern, for pick-up by another machine, for example a bale grab. U.S. Pat. No. 4,053,064 to Stewart, for example, discloses such a hay bale collector, wherein bales are shifted into alternating compartments, the entire load dumped when the compartments are filled by allowing the bales to come into frictional engagement with the ground surface and be thereby pulled off of the collector. U.S. Pat. No. 4,215,964 to Schrag et al. teaches a bale-accumulating trailer that can accumulate multiple bales and dump them in a fashion similar to Stewart, using frictional engagement with the ground surface. U.S. Pat. No. 5,829,238 to Branson also teaches a bale accumulator that accommodates multiple bales, while sensors are employed to lower the platform on which the bales rest to allow them to come into frictional engagement with the ground surface. Finally, U.S. Pat. No. 5,842,823 to Kohnen et al. also discloses a bale-accumulating trailer that is tilted to allow ground surface contact as a means to pull the bales form the trailer prior to pick-up by a bale grab. Various mechanisms are employed to move the bales toward the back of the accumulator for dumping, such as the dumping frame of Kohnen et al., although many accumulators are of a size that only one row of bales can be received and moving on the accumulator platform is therefore not required.

A recurring problem with multiple-bale bale accumulators, however, is that they fail to dump the multiple bales in an even arrangement, usually requiring shutting down the baler and manually repositioning the bales prior to pick-up. An even arrangement, for example positioning the bales such that they are flush at one end, is necessary for stable stacking of bales on a truck or other transport means. Another problem is that the mechanism employed to move a bale rearwardly on the bale accumulator often requires that the operator stop the baler operation during dumping of a load of bales and until the mechanism has returned to a position to receive the next load. For example, with accumulators that employ a pusher arm or similar device to move the bales in a rearward direction, ejection of bales from the baler must be stopped or bales will come down in front of the arm, preventing its return to the start position at the front of the accumulator. In addition, the design of most accumulators forces the operator to dump the multiple bales in a location determined by the time of filling the accumulator; this may be in a convenient location for pick-up but often it is not.

SUMMARY OF THE INVENTION

What is required is an accumulator that manipulates bales as desired while allowing uninterrupted operation and dumping at any desired location.

According to one aspect of the present invention there is provided a bale accumulator for use with a baler for producing rectangular bales of agricultural crops as the baler traverses a field in a forward direction of travel, and extruding the bales longitudinally from a rear end of the baler, said accumulator comprising:

a hitch for connecting the accumulator to the rear end of the baler to be towed thereby;

a platform for receiving bales extruded by the baler;

positioning means for arranging the bales in a selected array on the platform;

a pusher mounted for movement longitudinally of the platform;

actuating means on the accumulator for moving the pusher rearwardly along the platform to move bales along the platform;

a rear bale support rearwardly of the platform for supporting bales as they are moved off of the platform by the pusher; and a forward bale support extending forwardly from the pusher for supporting a bale in front of and above the pusher as it is extruded from the baler, the forward bale support comprising:

an elongate support member;

a rear support mount mounting a rear end of the support member on the pusher to travel therewith along the platform; and a front support mount for mounting a forward portion of the support member on the baler for longitudinal sliding movement relative to the baler.

The rear bale support holds the bales off the ground during discharge from the platform. This limits the disruption of the bale array by differential ground friction on the different bales. The forward bale support supports a bale as it is extruded by the baler, to prevent the bale from dropping to the platform in front of the pusher.

In exemplary embodiments of the present invention, the forward bale support may include two elongate, parallel, laterally spaced support members; whereas a single support member is sufficient for a 3 foot bale, for example, a second support member may be desirable for a 4 foot bale. The elongate support member is preferably but not necessarily a spring steel strap. The rear support mount preferably comprises two mounting lugs on the pusher and a bolt disposed between and connecting the mounting lugs, the rear end of the support member being connected to the bolt between the mounting lugs. The front support mount preferably comprises a channel member on the baler (which may be an existing structure on some balers, or a structure added to the baler to facilitate adaptation), two plastic blocks slideably disposed within the channel member for movement therein, a pin disposed between and connecting the plastic blocks (the forward portion of the support member connected to the pin between the plastic blocks), and retaining means on the channel member for retaining the plastic blocks within the channel member.

The positioning means preferably comprise an elongate arm member parallel to the direction of travel and moveable in a lateral direction to push a bale laterally across the platform, and more preferably to push bales extruded sequentially onto the platform to opposite sides of the platform, leaving the center space clear to receive a third bale for dumping. Unlike some other commercially available accumulators, the third bale in the present invention need not be moved to a side to allow dumping; all three bales can be dumped simultaneously. The accumulator of the present invention can automatically dump two bales side-by-side, two bales with a one-bale gap between them, three bales side-by-side and/or manually dump at any time regardless of positioning of bales.

The pusher is preferably an elongate member disposed perpendicular to the direction of travel, and the actuating means are preferably but not necessarily hydraulic cylinders connected to the pusher at a first end and the platform at a second end. The pusher may include a roller for engagement with a bale.

In preferred embodiments of the present invention, the rear bale support comprises a series of parallel spaced rollers to engage bottom surfaces of the three bales and support the bales as they move in a rearward direction off of the accumulator. At least one of the rollers is preferably fitted with protuberances to engage the bottom surfaces of the bales to assist in moving the three bales off of the accumulator at the same speed so that they are deposited in the desired array on the ground.

The forwardly facing edge of the accumulator may be fitted with extensions projecting toward the baler to provide further support to the bales as they move onto the platform.

It can be seen, therefore, that the present invention manipulates bales as desired, including automatically in two-bale arrangements, while allowing uninterrupted operation of the baler and deposition at any desired location. The present invention allows an operator to deposit multiple bales on the ground in an even arrangement without requiring shutting down the baler and manually repositioning the bales prior to pick-up, enabling stable stacking of bales on a truck or other transport. Also, while the present invention employs a pusher mechanism to move a bale rearwardly on the bale accumulator, the forward bale support ensures that the operator need not stop the baler operation until the bale accumulator has dumped its prior load of bales in order to return the mechanism to a position to receive the next load; rather, the next set of bales can be loading onto the platform while the previous set is dumped. Finally, the present invention allows the operator to dump the multiple bales in any desired location, not one determined solely by the time of filling the accumulator. The accumulator of the present invention can also be turned off and dump single bales over the back, while some other commercially available accumulators must be disconnected to allow this.

A detailed description of an exemplary embodiment of the present invention is given in the following. It is to be understood, however, that the invention is not to be construed as limited to this embodiment.

BRIEF DESCRIPTION OF THE DRAWINGS

In the accompanying drawings, which illustrate an exemplary embodiment of the present invention.

DETAILED DESCRIPTION OF AN EXEMPLARY EMBODIMENT

Figure 1:
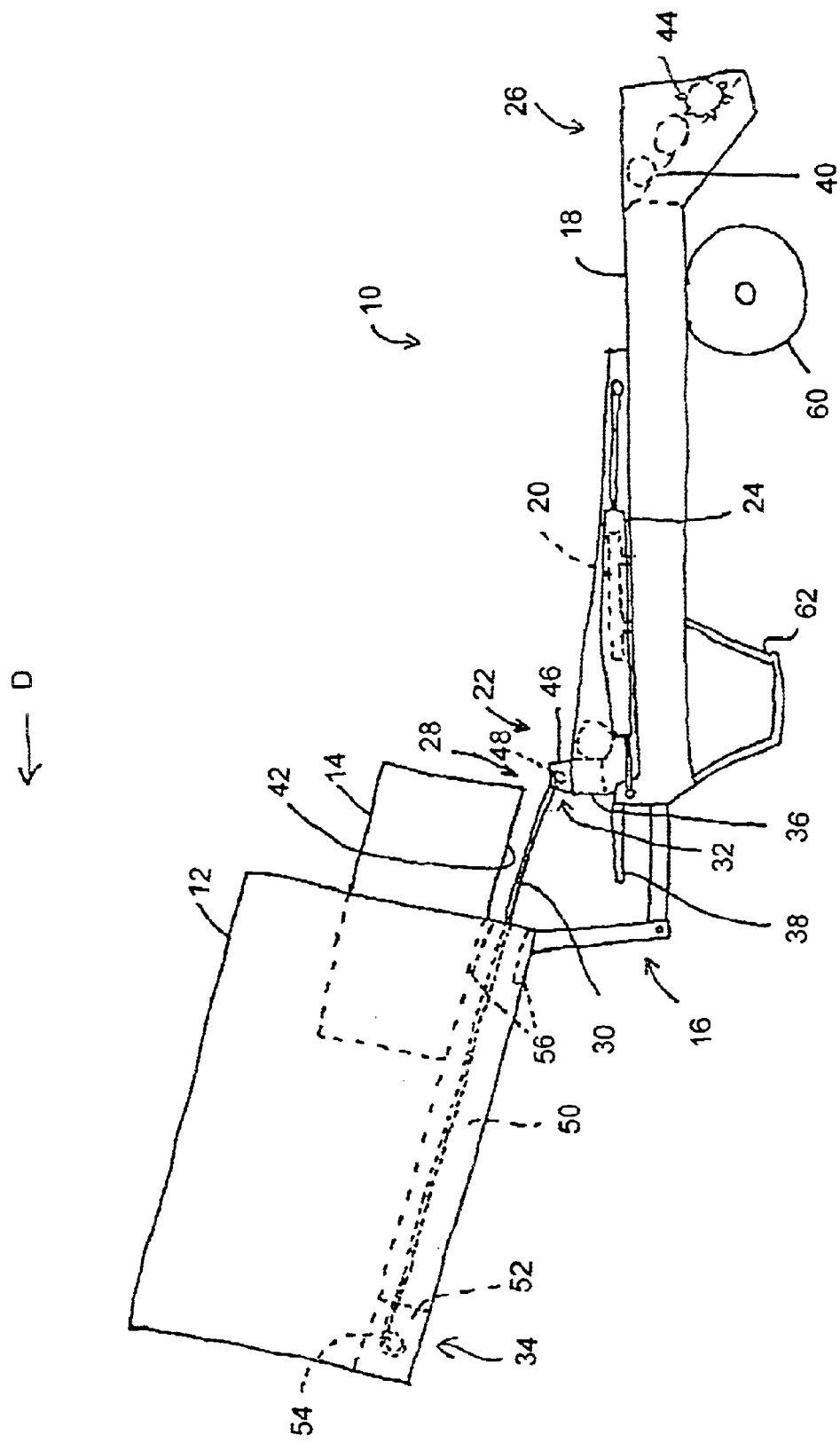
FIG. 1 is a side elevational view of the baler and the bale accumulator of the present invention.
Figure 3:
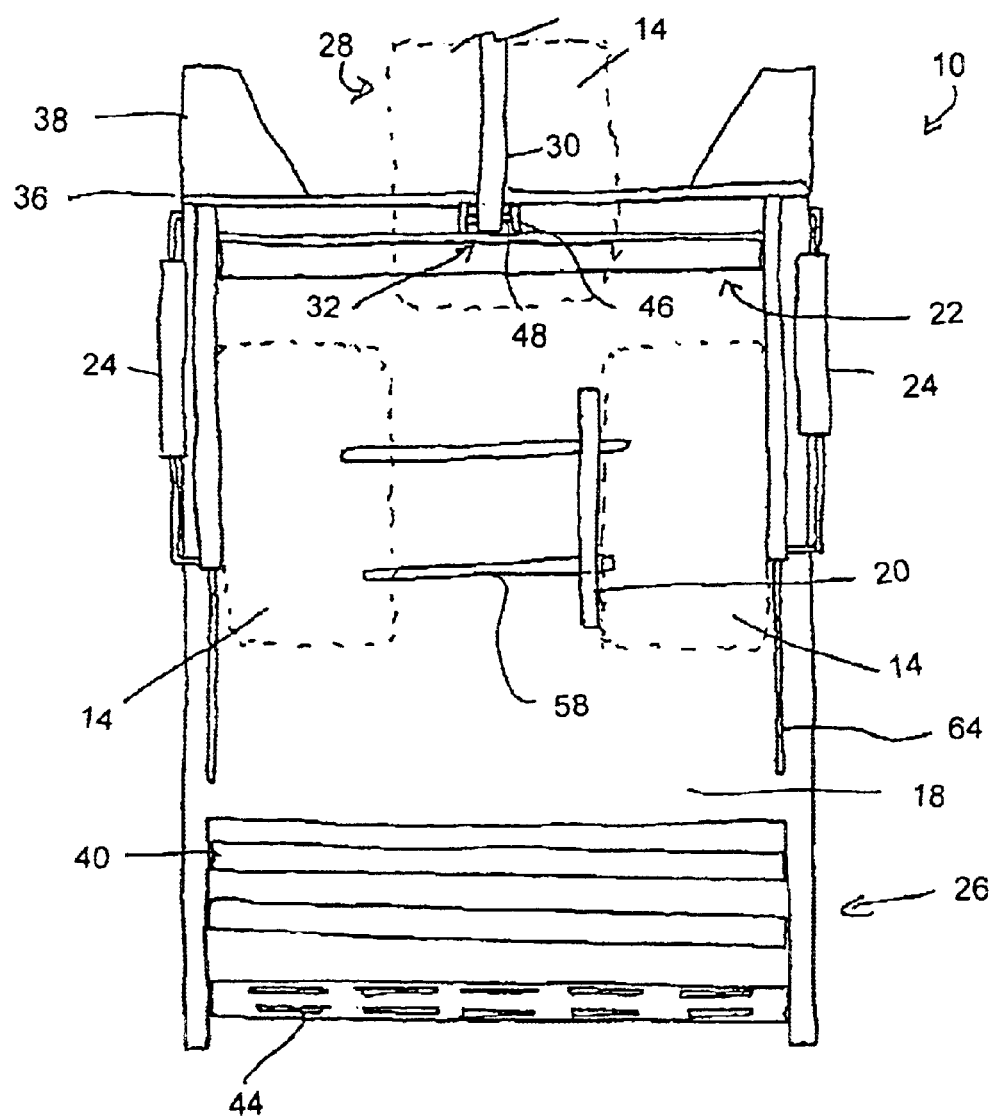
FIG. 3 is a plan view of the bale accumulator of the present invention.

Referring now in detail to the accompanying drawings, there is illustrated an exemplary embodiment of the bale accumulator of the present invention generally referred to by the numeral 10, for use with a baler 12 for producing rectangular bales 14 of agricultural crops as the baler 12 traverses a field in a forward direction of travel, indicated by the arrow D in FIG. 1, and extruding the bales 14 longitudinally from a rear end of the baler 12. The baler 12 is depicted in simplified fashion, representing simply a means of producing bales 14 for receipt by the bale accumulator 10. Referring in particular to FIGS. 1 and 3, the accumulator 10 comprises a hitch 16 for connecting the accumulator 10 to the rear end of the baler 12, a platform 18 for receiving bales extruded by the baler 12, positioning means 20 for arranging the bales 14 in a selected array on the platform 18, a pusher 22 mounted for movement longitudinally of the platform 18, a rear bale support 26, and a forward bale support 28. The positioning means 20 can be associated with sensor means (not shown) to determine how to position an incoming bale 14. The pusher 22 is connected to actuating means 24 on the accumulator 10, hydraulic cylinders in the exemplary embodiment, for moving the pusher 22 rearwardly along the platform 18 to move bales 14 along the platform 18. The pusher 22, which includes a roller, moves rearwardly in the exemplary embodiment along rails 64. It is the roller of the pusher 22 which comes into contact with the bales 14. The positioning means 20 connect with a conventional powering means (not shown) preferably disposed immediately beneath the platform 18 by connective means disposed within apertures 58 in the platform 18. The bale accumulator 10 is fitted with wheels 60 and supports 62.

The rear bale support 26 is situated rearwardly of the platform 18 for supporting bales 14 as they are moved off of the platform 18 by the pusher 22. Rollers 40 are mounted on the bale accumulator 10 to rotate about an axis perpendicular to the direction of travel D. At least one of the rollers 40 is preferably but not necessarily fitted with protuberances 44 to better grip the bottom surface 42 of a bale 14.

Figure 2:
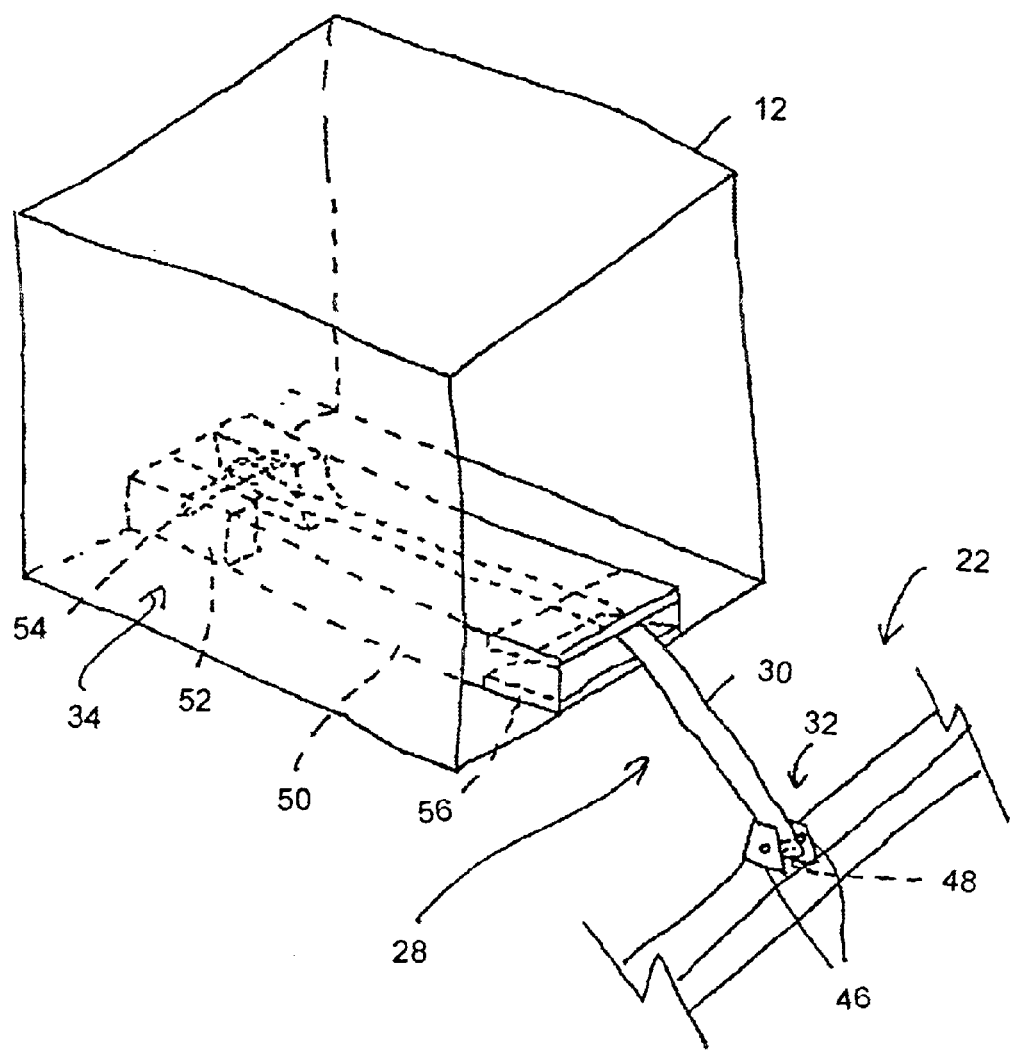
FIG. 2 is a perspective view showing the position and arrangement of the forward bale support.

As can best be seen in FIG. 2, the forward bale support 28 extends forwardly from the pusher 22 for supporting a bale 14 in front of and above the pusher 22 as it is extruded from the baler 12. The forward bale support comprises an elongate support member 30, a rear support mount 32 mounting a rear end of the support member 30 on the pusher 22 to travel therewith along the platform 18, and a front support mount 34 for mounting a forward portion of the support member 30 on the baler 12 for longitudinal sliding movement relative to the baler 12. The rear support mount 32 of the exemplary embodiment is a pair of mounting lugs 46 with a bolt 48 disposed therebetween, the rear end of the elongate support member 30 connected to the bolt 48 between the mounting lugs 46. The front support mount 34 of the exemplary embodiment comprises a channel member 50, which may be an existing part of the baler 12 structure or an addition to the structure, plastic blocks 52 within the channel member 50 with a pin 54 disposed therebetween, the forward end of the elongate support member 30 connected to the pin 54 between the plastic blocks 52. The rearward end of the channel member 50 is fitted with retaining means 56, which may be plastic blocks, to retain the plastic blocks 52 within the channel member 50 while allowing the elongate support member 30 to protrude rearwardly out of the channel member 50 toward the bale accumulator 10.

In the exemplary embodiment, the bale accumulator 10 is fitted with extensions 38 at a forwardly facing edge 36.

The utility of the present invention becomes clear in the following situation. When a bale 14 is produced by the baler 12, it is extruded from the rear end of the baler 12. The bale 14 moves onto the bale accumulator 10, the forward bale support 28 providing means to ensure that the bale 14 does not fall behind the pusher 22 if the pusher 22 is in a rearward position. Once the pusher 22 is in a forward position, the bale 14 can be moved behind the pusher 22. The bale 14 is then positioned by the positioning means 20, preferably including sensor means as described above. The bale 14 can be moved to one side of the platform 18 or the other as desired. In a preferred array, a first bale 14 is moved to one side of the platform 18, a second bale 14 is then moved to the other side of the platform 18, and a third bale 14 is finally positioned between the first two bales 14. This three-bale array, indicated in dashed lines on FIG. 3 prior to the third bale 14 being moved into position, is then moved in a rearward direction along the platform 18 by the pusher 22, moving across the rollers 40 and off of the bale accumulator 10 onto the ground at a desired location. While the array is being moved off of the bale accumulator 10, further bales 14 can be extruded onto the bale accumulator 10 and positioned by the positioning means 20. Due to the action of the pusher 22 on the bales 14, the bales 14 are positioned flush with each other at the end in contact with the pusher 22 and retain that arrangement when moved onto the ground. Operation of the baler 12 need not be interrupted at any stage.

While a particular embodiment of the present invention has been described in the foregoing, it is to be understood that other embodiments are possible within the scope of the invention and are intended to be included herein. It will be clear to any person skilled in the art that modifications of and adjustments to this invention, not shown, are possible without departing from the spirit of the invention as demonstrated through the exemplary embodiment. The invention is therefore to be considered limited solely by the scope of the appended claims.

Embodiments of the invention in which an exclusive property or privilege is claimed are defined as follows:

1. A bale accumulator for use with a baler for producing rectangular bales of agricultural crops as the baler traverses a field in a forward direction of travel, and extruding the bales longitudinally from a rear end of the baler, said accumulator comprising:

a hitch for connecting the accumulator to the rear end of the baler to be towed thereby;

a platform for receiving bales extruded by the baler;

positioning means for arranging the bales in a selected array on the platform;

a pusher mounted for movement longitudinally of the platform;

actuating means on the accumulator for moving the pusher rearwardly along the platform to move bales along the platform;

a rear bale support rearwardly of the platform for supporting bales as they are moved off of the platform by the pusher; and a forward bale support extending forwardly from the pusher for supporting a bale in front of and above the pusher as it is extruded from the baler, the forward bale support comprising:

an elongate support member;

a rear support mount mounting a rear end of the support member on the pusher to travel therewith along the platform; and a front support mount for mounting a forward portion of the support member on the baler for longitudinal sliding movement relative to the baler.

2. The bale accumulator of claim 1 wherein the forward bale support includes two elongate, parallel, laterally spaced support members.

3. The bale accumulator of claim 1 wherein a forwardly facing edge of the accumulator is fitted with extensions projecting toward the baler to provide further support to bales as they move onto the platform.

4. The bale accumulator of claim 1 wherein the positioning means comprise an elongate arm member parallel to the direction of travel and moveable in a lateral direction to push a bale laterally across the platform.

5. The bale accumulator of claim 1 wherein the positioning means comprise an elongate arm member parallel to the direction of travel and moveable in a lateral direction to push bales extruded sequentially onto the platform to opposite sides of the platform.

6. The bale accumulator of claim 1 wherein the actuating means are hydraulic cylinders connected to the pusher at a first end and the platform at a second end.

7. The bale accumulator of claim 1 wherein the elongate support member is a steel strap.

8. The bale accumulator of claim 1 wherein the rear support mount comprises:

two mounting lugs on the pusher; and a bolt disposed between and connecting the mounting lugs, the rear end of the support member connected to the bolt between the mounting lugs.

9. The bale accumulator of claim 1 wherein the front support mount comprises:

a channel member on the baler;

two plastic blocks slidably disposed within the channel member for movement therein;

a pin disposed between and connecting the plastic blocks, the forward portion of the support member connected to the pin between the plastic blocks; and retaining means on the channel member for retaining the plastic blocks within the channel member.

10. The bale accumulator of claim 1 wherein the pusher is an elongate member disposed perpendicular to the direction of travel.

11. The bale accumulator of claim 10 wherein the pusher includes a roller for engagement with a bale.

12. The bale accumulator of claim 1 wherein the rear bale support comprises a series of parallel spaced rollers to engage a bottom surface of a bale and move the bale in a rearward direction and off of the accumulator.

13. The bale accumulator of claim 12 wherein at least one of the rollers is fitted with protuberances to engage the bottom surface of the bale to assist in moving the bale off of the accumulator.

* * * * *